United States Patent

Rische et al.

(10) Patent No.: US 6,784,243 B2
(45) Date of Patent: Aug. 31, 2004

(54) POLYURETHANE-POLYUREA DISPERSIONS

(75) Inventors: Thorsten Rische, Unna (DE); Karin Naujoks, Odenthal (DE); Thomas Feller, Solingen (DE); Christoph Gürtler, Köln (DE); Jan Mazanek, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/458,056

(22) Filed: Jun. 10, 2003

(65) Prior Publication Data

US 2003/0232199 A1 Dec. 18, 2003

(30) Foreign Application Priority Data

Jun. 17, 2002 (DE) .......................................... 102 26 931
Aug. 14, 2002 (DE) .......................................... 102 26 926
Aug. 14, 2002 (DE) .......................................... 102 26 925
Aug. 14, 2002 (DE) .......................................... 102 26 924
Aug. 14, 2002 (DE) .......................................... 102 26 927

(51) Int. Cl.$^7$ ............................ C08G 18/80; C08J 3/03; C08L 75/00; C09D 175/00
(52) U.S. Cl. ....................... 524/591; 8/115.6; 428/375; 428/378; 428/423.1; 428/425.6; 524/839; 524/840; 528/45; 528/71
(58) Field of Search ........................... 8/115.6; 428/375, 428/378, 423.1, 425.6; 524/591, 839, 840; 528/45, 71

(56) References Cited

U.S. PATENT DOCUMENTS

| 4,387,181 A | 6/1983 | Brown et al. ............... 524/714 |
|---|---|---|
| 4,482,721 A | 11/1984 | Wegner et al. .............. 548/262 |
| 4,495,229 A | 1/1985 | Wolf et al. .............. 427/388.2 |
| 4,658,005 A | 4/1987 | Gras et al. .................... 528/45 |
| 4,976,837 A | 12/1990 | Hughes et al. ........... 204/181.7 |
| 5,246,557 A | 9/1993 | Hughes et al. ........... 204/181.4 |
| 5,294,665 A | 3/1994 | Pedain et al. ................ 524/591 |
| 5,352,755 A | 10/1994 | Hughes et al. ................ 528/45 |
| 5,455,297 A | 10/1995 | Pedain et al. ................ 524/591 |
| 5,621,063 A | 4/1997 | Wolf et al. .................... 528/45 |
| 5,738,912 A | 4/1998 | König et al. ................. 427/389 |
| 5,986,033 A | 11/1999 | Hughes et al. ................. 528/45 |
| 6,063,860 A | 5/2000 | Rimmer et al. ............. 524/590 |
| 6,368,669 B1 | 4/2002 | Hughes et al. ........... 427/385.5 |

FOREIGN PATENT DOCUMENTS

CA      1 187 083      5/1985

*Primary Examiner*—Rabon Sergent
(74) *Attorney, Agent, or Firm*—Joseph C. Gil

(57) ABSTRACT

The invention relates to polyurethane-polyurea dispersions, also called PU dispersion, which contain aralkylamine-blocked isocyanate groups, and to their preparation and use. This blocking agent ahs a significantly lower deblocking temperature as compared with the prior art. Coatings produced from this dispersion have high hydrolysis resistances. The arylamine-blocked isocyanate groups are composed of polyisocyanates, polymeric polyols having average molar weights of 400 to 6000, at least one blocking agent, and either or both of nonionically hydrophilicizing compounds or compounds having at least one ionic or potentially ionic group.

15 Claims, No Drawings

POLYURETHANE-POLYUREA DISPERSIONS

CROSS REFERENCE TO RELATED PATENT APPLICATIONS

The present patent application claims the right of priority under 35 U.S.C. §119 (a)–(d) of German Patent Applications No. 10226931.9, filed Aug. 14, 2002.

BACKGROUND OF THE INVENTION

1. Field of the Invention

The invention relates to polyurethane-polyurea dispersions, referred to below as PU dispersion, which contain aralkylamine-blocked isocyanate groups, and to their preparation and use.

2. Description of the Related Art

In the coating of substrates, solvent-containing binders are increasingly being replaced by aqueous, environmentally friendly systems. An increasing role has been played in particular by binders based on polyurethane-polyurea dispersions, owing to their excellent properties. Many areas of application are using 2K (2-component) systems, which are generally composed of an OH-functional binder and a polyisocyanate (blocked or not blocked). Furthermore, 1K (1-component) self-crosslinking PU dispersions, which, as described for example in U.S. Pat. No. 4,387,181, possess blocked isocyanate groups and isocyanate-reactive groups, are of great interest for many areas. The thermal treatment of the systems following application produces highly crosslinked coatings which, however, exhibit little or no chemical crosslinking with the coated substrate. PU dispersions which, in contrast to this, possess blocked isocyanate groups and no significant amounts of isocyanate-reactive groups may be crosslinked, under thermal loading, with the substrate to which they have been applied or into which they have been incorporated. This type of what are referred to as post-crosslinkable PU dispersions is described in, for example, DE-A 195 48 030.

The principal compounds used for blocking isocyanates and polyisocyanates are ε-caprolactam, butanone oxime, malonates, secondary amines, and triazole derivatives and pyrazolee derivatives, as described in, for example, EP-A 0 576 952, EP-A 0 566 953, EP-A 159 117, U.S. Pat. No. 4,482,721, WO 97/12924 or EP-A 0 744 423 and also DE-A 195 48 030.

Secondary amine blocking agents, including aralkyl-substituted amines, are known from, for example, EP-A 0 096 210. The use of such amines in aqueous systems, particularly in post-crosslinkable PU dispersions, however, is not known from EP-A 0 096 210.

The preparation of aqueous post-crosslinkable PU dispersions normally involves using prior art blocking agents such as, for example, ε-caprolactam, and butanone oxime.

Whereas for post-crosslinkable PU dispersions possessing ε-caprolactam-blocked isocyanate groups it is normal to employ baking temperatures around 160° C., post-crosslinkable PU dispersions for which butanone oxime has been used as the blocking agent can be deblocked at temperatures lower by 10–20° C. At these temperatures, however, the desired properties are no longer achieved in many coatings. Furthermore, high deblocking temperatures or drying temperatures often cause unwanted thermal yellowing of the binders or coating. Moreover, these deblocking temperatures are now considered too high, for reasons of cost, so that a demand has developed for post-crosslinkable PU dispersions containing blocked isocyanate groups which crosslink with a corresponding substrate at temperatures lower than in the case of butanone oxime.

A further disadvantage of prior art post-crosslinkable PU dispersions is the low hydrolysis stability in films and coatings.

SUMMARY OF THE INVENTION

The object of the present invention is therefore to provide post-crosslinkable PU dispersions containing isocyanate groups blocked with a blocking agent which has a significantly lower deblocking temperature as compared with the prior art and, furthermore, where coatings resulting from this coating composition have high hydrolysis resistances.

It is now been found that PU dispersions possesssing aralkylamine-blocked isocyanate groups meet the above-mentioned profile of requirements.

The present invention provides post-crosslinkable aqueous PU dispersions containing aralkylamine-blocked isocyanate groups composed of the following components:

A1) polyisocyanates,

A2) polymeric polyols having average molar weights of 400 to 6 000,

A3) optionally mono- or polyalcohols or mono- or polyamines having average molar weights of up to 400, A4) at least one blocking agent, of which at least 20% by weight is composed of aralkylamines, and at least one compound selected from A5) compounds which have at least one ionic or potentially ionic group and/or A6) nonionically hydrophilicizing compounds, plus, where appropriate, diluents, solvents and adjuvants.

The dispersed polymer obtained from components A1) to A6) essentially no longer contains any isocyanate-reactive groups.

DETAILED DESCRIPTION OF THE INVENTION

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

The solids content of the post-crosslinkable PU dispersions of the invention can be varied within limits of from 10 to 70% by weight. The post-crosslinkable PU dispersions of the invention preferably contain a solids content of from 20 to 60% by weight and with particular preference from 25 to 50% by weight. As a proportion of the overall composition, the fraction of organic solvents is preferably less than 15% by weight, with particular preference less than 10% by weight and with very particular preference less than 5% by weight.

In the context of the invention, a potentially ionic group is a group which is capable of forming an ionic group.

Preferably, the PU dispersions according to the invention contain 10 to 40% by weight of A1), 30 to 90% by weight of A2), 0 to 30% by weight of A3) 1 to 20% by weight of A4), 0 to 15% by weight of ionic or potentially ionic compounds A5) and 0 to 40% by weight of compounds A6), the sum of the components being 100% by weight.

More preferably, the PU dispersions according to the invention contain 10 to 30% by weight of A1), 30 to 80% by weight of A2), 0 to 20% by weight of A3), 1 to 15% by weight of A4), 0 to 8% by weight of ionic or potentially ionic compounds A5) and 0 to 35% by weight of compounds A6), the sum of the components being 100% by weight.

Most preferably, the PU dispersions contain 15 to 30% by weight of A1), 30 to 70% by weight of A2), 0 to 10% by weight of A3), 1 to 10% by weight of A4) 0 to 8% by weight of ionic or potentially ionic compounds A5) and 5 to 30% by weight of compounds A6), the sum of the components being 100% by weight.

Suitable diisocyanates (A1) are in principle those of the molecular weight range 140 to 400, having aliphatically, cycloaliphatically, araliphatically and/or aromatically bonded isocyanate groups, such as, for example, 1,4-diisocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexane (isophorone diisocyanate, IPDI), 4,4'-diisocyanato-dicyclohexylmethane, 1-isocyanato-1-methyl-4(3)-isocyanatomethylcyclohexane, bis-(isocyanatomethyl)-norbornane, 1,3- and 1,4-bis-(2-isocyanato-prop-2-yl)-benzene (TMXDI), 2,4- and 2,6-diisocyanatotoluene (TDI), 2,4'- and 4,4'-diisocyanatodiphenylmethane, 1,5-diisocyanatonaphthalene or any desired mixtures of such diisocyanates.

They are preferably polyisocyanates or polyisocyanate mixtures of said type having exclusively aliphatically and/or cycloaliphatically bonded isocyanate groups. Very particularly preferred starting components (A1) are polyisocyanates and polyisocyanate mixtures based on HDI, IPDI and/or 4,4'-diisocyanato-dicyclohexylmethane.

Any desired polyisocyanates prepared by modification of simple aliphatic, cycloaliphatic, araliphatic and/or aromatic diisocyanates, composed of at least two diisocyanates and having a uretdione, isocyanurate, urethane, allophanate, biuret, iminooxadiazinedione and/or oxadiazinetrione structure, as described, for example, in J. Prakt. Chem. 336 (1994), pages 185–200, are further suitable as polyisocyanates (A1).

At least 5%, preferably at least 10% and particularly preferably at least 15% of the isocyanate groups of the polyisocyanate (A1) of the PU dispersions according to the invention are in blocked form.

The polymeric polyols (A2) in the molar weight range from 400 to 6000 are the customary ones as have long been used for polyurethanes and have an OH functionality of at least 1.6 to 4, such as, for example, polyacrylates, polyesters, polylactones, polyethers, polycarbonates, polyestercarbonates, polyacetals, polyolefins and polysiloxanes. Polyols in a molar weight range from 600 to 2500 and having an OH functionality of 2 to 3 are preferred.

The suitable polycarbonates having hydroxyl groups are obtainable by reacting carbonic acid derivatives, for example diphenyl carbonate, dimethyl carbonate or phosgene, with diols. Suitable such diols are, for example, ethylene glycol, 1,2-and 1,3-propanediol, 1,3- and 1,4-butanediol, 1,6-hexanediol, 1,8-octanediol, neopentylglycol, 1,4-bishydroxymethylcyclohexane, 2-methyl-1,3-propanediol, 2,2,4-trimethyl-1,3-pentanediol, dipropylene glycol, polypropylene glycols, dibutylene glycol, polybutylene glycols, bisphenol A, tetrabromobisphenol A and lactone-modified diols. The diol component preferably contains 40 to 100% by weight of hexanediol, preferably 1,6-hexanediol, and/or hexanediol derivatives, preferably those which have ether or ester groups in addition to terminal OH groups, e.g. products which were obtained by reacting 1 mol of hexanediol with at least 1 mol, preferably 1 to 2 mol, of caprolactone according to DE-A 17 70 245 or by etherifying hexanediol with itself to give di- or trihexylene glycol. The preparation of such derivatives is disclosed, for example, in DE-A 15 70 540. The polyether-polycarbonatediols described in DE-A 37 17 060 can also be used.

The hydroxypolycarbonates should be substantially linear. However, they may optionally be slightly branched by incorporation of polyfunctional components, in particular low molecular weight polyols. For example, glycerol, trimethylol-propane, 1,2,6-hexanetriol, 1,2,4-butanetriol, trimethylolpropane, pentaerythritol, quinitol, mannitol and sorbitol, methylglycoside and 1,3,4,6-dianhydrohexitols are suitable for this purpose.

Suitable polyetherpolyols are the polytetramethylene glycol polyethers which are known per se in polyurethane chemistry and can be prepared, for example, via polymerization of tetrahydrofuran by cationic ring opening.

Other suitable polyetherpolyols are polyethers, such as, for example, the polyols prepared using initiator molecules from styrene oxide, propylene oxide, butylene oxides or epichlorohydrins, in particular of propylene oxide.

Suitable polyesterpolyols are, for example, reaction products of polyhydric, preferably dihydric and optionally additionally trihydric, alcohols with polybasic, preferably dibasic, carboxylic acids. Instead of the free polycarboxylic acids, it is also possible to use corresponding polycarboxylic anhydrides or corresponding polycarboxylic esters of lower alcohols or their mixtures for the preparation of the polyesters. The polycarboxylic acids may be aliphatic, cycloaliphatic, aromatic and/or heterocyclic and optionally substituted, for example by halogen atoms, and/or unsaturated.

Monofunctional alcohols and monoamines are suitable components (A3) for terminating the polyurethane prepolymer. Preferred monoalcohols are aliphatic monoalcohols having 1 to 18 C atoms, such as, for example, ethanol, n-butanol, ethylene glycol monobutyl ether, 2-ethylhexanol, 1-octanol, 1-dodecanol or 1-hexadecanol. Preferred monoamines are aliphatic monoamines, such as, for example, diethylamine, dibutylamine, ethanolamine, N-methylethanolamine or N,N-diethanolamine.

Polyols, aminopolyols or polyamines having a molar weight of less than 400, which are described in large numbers in the corresponding literature, are also suitable as component (A3).

Examples of preferred components (A3) are:
a) alkanediols, such as ethanediol, 1,2- and 1,3-propanediol, 1,4- and 2,3-butanediol, 1,5-pentanediol, 1,3-dimethylpropanediol, 1,6-hexanediol, neopentylglycol, cyclohexanedimethanol and 2-methyl-1,3-propanediol,
b) etherdiols, such as diethylene diglycol, triethylene glycol or hydroquinone dihydroxyethyl ether,
c) esterdiols of the general formulae (III) and (IV)

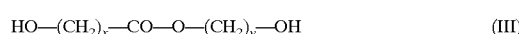

$$HO-(CH_2)_x-CO-O-(CH_2)_y-OH \qquad (III)$$

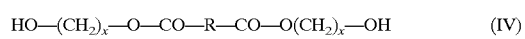

$$HO-(CH_2)_x-O-CO-R-CO-O(CH_2)_x-OH \qquad (IV)$$

in which
R is an alkylene or arylene radical having 1 to 10 C atoms, preferably 2 to 6 C atoms,
x is 2 to 6 and
y is 3 to 5,
such as, for example, δ-hydroxybutyl-ε-hydroxycaproates, ω-hydroxyhexyl-γ-hydroxybutyrates, β-hydroxyethyl adipate and bis(β-hydroxy-ethyl) terephthalate, and d) polyamines such as ethylenediamine, 1,2- and 1,3-diaminopropane, 1,4-diaminobutane, 1,6-diaminohexane, isophoronediamine, isomer mixture of 2,2,4- and 2,4,4-trimethylhexa-methylenediamine, 2-methyl-pentamethylenediamine, diethylenetriamine, 1,3- and 1,4-xylylenediamine, α, α, α', α'-tetramethyl-1,3- and -1,4-xylylenediamine and 4,4-diaminodicyclohexylmethane. Suitable diamines in the context of the invention are also hydrazine, hydrazine hydrate and substituted hydrazines, such as, for example, N-methylhydrazine, N,N'-dimethylhydrazine and their homologues and acid dihydrazides, adipic acid, β-methyladipic acid, sebacic acid, hydracrylic acid and terephthalic acid, semicarbazidoalkylene hydrazides, such as, for example, β-semicarbazidopropionic acid hydrazide (e.g. DE-A 17 70 591), semicarbazidoalkylene-carbazine esters, such as, for example, 2-semicarbazidoethylcarbazine ester (e.g. DE-A 19 18 504), or aminosemicarbazide compounds, such as, for example, β-aminoethyl semicarbazido-carbonate (e.g. DE-A 19 02 931).

The aralkylamines of component A4) correspond to the formula (V)

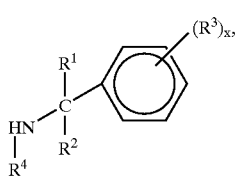

(V)

in which
R$^1$, R$^2$, R$^3$ can be identical or different and denote hydrogen, C$_1$–C$_4$-alkyl, C$_6$–C$_{10}$-cycloalkyl, preferably hydrogen,
R$^4$ denote C$_1$–C$_4$-alkyl, C$_6$–C$_{10}$-cycloalkyl or C$_1$–C$_{14}$-aralkyl, preferably methyl, ethyl, isopropyl and tert-butyl, particularly preferably tert-butyl,
x represents the number 1, 2, 3, 4 or 5.

As an example of blocking agents A4) mention maybe made of the following: N-methyl-, N-ethyl-, N-(iso)propyl-, N-n-butyl-, N-iso-butyl-, N-tert-butyl-benzylamine or 1,1-dimethylbenzylamine, N-alkyl-N-1,1-dimethylmethyl-phenylamine, adducts of benzylamine with compounds having activated double bonds such as malonates, N,N-dimethylaminopropylbenzylamine and other unsubstituted or substituted benzylamines containing tertiary amino groups, and/or dibenzylamine. It is of course also possible to use mixtures of these amines with one another and/or with other blocking agents. These are, for example, alcohols, lactams, oximes, malonates, alkyl acetoacetates, triazoles, phenols, imidazoles, pyrazoles, and amines, such as butanone oxime, diisopropylamine, 1,2,4-triazole, dimethyl-1,2,4-triazole, imidazole, diethyl malonate, ethyl acetoacetate, acetone oxime, 3,5-dimethylpyrazole, ε-caprolactam or any desired mixtures of these blocking agents. Preference is given to using N-aralkylamines such as N-(iso)propyl-, N-n-butyl, N-iso-butyl-, N-tert-butylbenzylamine as blocking agent A4). A more preferred blocking agent A4) is N-tert-butylbenzylamine.

Suitable ionic or potentially ionic compounds A5), which can be used as well as or instead of the nonionic compounds A6), are, for example, mono- and dihydroxycarboxylic acids, mono- and diaminocarboxylic acids, mono- and dihydroxysulfonic acids, mono- and diaminosulfonic acids and mono- and dihydroxyphosphonic acids or mono- and diaminophosphonic acids and their salts, such as dimethylolpropionic acid, hydroxypivalic acid, N-(2-aminoethyl)-β-alanine, 2-(2-amino-ethylamino)-ethanesulfonic acid, ethylenediamine-propanesulfonic or ethylenediamine-butanesulfonic acid, 1,2- or 1,3-propylene-diamine-β-ethylsulfonic acid, lysine, 3,5-diaminobenzoic acid, the hydrophilicizing agent according to Example 1 of EP-A 0 916 647 and its alkali metal and/or ammonium salts, the adduct of sodium bisulfite with but-2-ene-1,4-diol, polyethersulfonate, the propoxylated adduct of 2-butenediol and NaHSO$_3$ (e.g. in DE-A 2 446 440, pages 5–9, formula I–III), and building blocks, such as N-methyldiethanolamine, which can be converted into cationic groups can be used as hydrophilic components. Preferred ionic or potential ionic compounds A5) are those which have carboxyl or carboxylate and/or sulfonate groups and/or ammonium groups. Particularly preferred ionic compounds A5) are those which contain carboxyl and/or sulfonate groups as ionic or potentially ionic groups, such as the salts of N-(2-aminoethyl)-β-alanine, 2-(2-aminoethylamino)ethanesulfonic acid, of the hydrophilicizing agent according to Example 1 of EP-A 0 916 647 and of dimethylolpropionic acid.

The hydroxy components among components (A2), (A3) and (A5) may contain double bonds which may originate, for example, from long-chain aliphatic carboxylic acids or fatty alcohols. Functionalization with olefinic double bonds is possible, for example, by the incorporation of allylic groups or of acrylic acid or methacrylic acid and their respective esters.

Furthermore, the PU dispersions according to the invention may contain nonionically hydrophilicizing compounds (A6), e.g. polyoxyalkylene ethers having at least one hydroxyl or amino group. These polyethers contain a proportion of 30% by weight to 100% by weight of building blocks which are derived from ethylene oxide. Suitable polyethers include linear polyethers having a functionality of between 1 and 3, but also compounds of the general formula (VI)

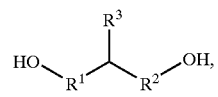

(VI)

in which
R$^1$ and R$^2$, independently of one another, each denote a divalent aliphatic, cycloaliphatic or aromatic radical having 1 to 18 C atoms which may be interrupted by oxygen and/or nitrogen atoms and
R$^3$ represents a non-hydroxyl-terminated polyester or preferably polyether. R$^3$ eparticularly preferably represents an alkoxy-terminated polyethylene oxide radical.

Nonionicaly hydrophilicizing compounds A6) include, for example, monohydric polyalkylene oxide polyether alcohols which contain on average from 5 to 70, preferably from 7 to 55, ethylene oxide units per molecule, such as are available in conventional manner by alkoxylation of suitable initiating molecules (e.g. in Ullmanns Encyclopädie der technischen Chemie, 4th edition, volume 19, Verlag Chemie, Weinheim pp. 31–38). Examples of suitable initiating molecules are saturated monoalcohols such as methanol, ethanol, n-propanol, isopropanol, n-butanol, isobutanol, sec-butanol, the isomers pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexan, 3-ethyl-3-hydroxymethyloxetane, or tetrahydrofurfuryl alcohol; diethylene glycol monoalcohol ethers such as, for example, diethylene glycol monobutyl ether; unsaturated alcohols such as allyl alcohol, 1,1-dimethyl allyl alcohol or oleyl alcohol, aromatic alcohols such as phenol, the isomeric cresols or methoxy-phenols, araliphatic alcohols such as benzyl alcohol, anisyl alcohol or cinnamyl alcohol; secondary monoamines such as dimethylamine, diethylamine, dipropylamine, diisopropylamine, dibutylamine, bis-(2-ethylhexyl)-amine, N-methyl- and N-ethylcyclohexylamine or dicyclohexylamine and also heterocyclic secondary amines such as morpholine, pyrrolidine, piperidine or 1H-pyrazole.

Preferred initiating molecules are saturated monoalcohols and also diethylene glycol monoalkyl ethers. Particular preference is given to using diethylene glycol monobutyl ether as initiating molecule.

Alkylene oxides particularly suitable for the alkoxylation reaction are ethylene oxide and propylene oxide, which may be used in any order or else in a mixture for the alkoxylation reaction.

The polyalkylene oxide polyether alcohols are either pure polyethylene oxide polyethers or mixed polyalkylene oxide polyethers at least 30 mol % preferably at least 40 mol % of whose alkylene oxide units consist of ethylene oxide units. Preferred nonionic compounds are monofunctional mixed polyalkylene oxide polyethers which contain at least 40 mol % of ethylene oxide units and not more than 60 mol % of propylene oxide units.

For hydrophilicizing the post-crosslinkable PU dispersions of the invention it is also possible to use combinations of ionic (A5) and nonionic (A6) hydrophilicizing agents. In this case it is preferred to use combinations of anionic (A5) and nonionic (A6) hydrophilicizing agents. Overall, for the preparation of the post-crosslinkable PU dispersions of the invention, preference is given to the exclusive use of non-ionic hydrophilicizing agents A6).

The aqueous polyurethane dispersions of the invention are prepared in the manner known from the prior art, as summarized, for example, by D. Dieterich in a review article [D. Dieterich, Prog. Org. Coatings 9, 281 (1981)]. The polyisocyanate component A1) is reacted to completion with components A2) and/or A3) and/or A6), blocking agents A4) and low molecular weight chain extenders A3) and/or A5) to give a polyurethane, where appropriate with the use of a solvent which can be separated off again later. Suitable solvents are the customary paint solvents known per se, such as, for example, ethyl acetate, butyl acetate, 1-methoxyprop-2-yl acetate, 3-methoxy-n-butyl acetate, acetone, 2-butanone, 4-methyl-2-pentanone, cyclohexanone, toluene, xylene, chlorobenzene, mineral spirit, mixtures which contain in particular relatively highly substituted aromatics, as are commercially available, for example, under the names Solvent Naphtha, Solvesso® (Exxon Chemicals, Houston, USA), Cypar® (Shell Chemicals, Eschborn, Del.), Cyclo Sol® (Shell Chemicals, Eschborn, Del.), Tolu Sol® (Shell Chemicals, Eschborn, Del.), Shellsol® (Shell Chemicals, Eschborn, Del.), carbonic acid esters, such as dimethyl carbonate, diethyl carbonate, 1,2-ethylene carbonate and 1,2-propylene carbonate, lactones, such as β-propiolactone, γ-butyrolactone, ε-caprolactone and ε-methyl-caprolactone, propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such solvents. Preferred solvents are acetone, 2-butanone and N-methylpyrrolidone. Acetone is particularly preferred.

In a further step, groups capable of neutralization are then optionally converted into the salt form and transferred to the aqueous phase. Depending on the degree of neutralization and content of ionic groups, the dispersion may be made very finely divided so that it virtually has the appearance of a solution, but very coarse-particled formulations are also possible and are likewise sufficiently stable.

However, mean particle sizes of less than 300 nm are preferred since these improve the emulsification of a polyisocyanate and hence the quality of the coating film.

Preferably, the polyol components A2), A3) and A6) and also the blocking agent A4) are introduced initially and reacted with the polyisocyanates A1. Thereafter any further hydroxy-functional components A3) are added and the reaction mixture is reacted to give a polyurethane prepolymer, without addition of solvent. The prepolymer is dispersed by adding water. Then any amino-functional components A3) and/or A5) are added in the form, for example, of an aqueous solution.

The solids content of the post-crosslinkable PU dispersions of the invention can be varied within limits from 10 to 70% by weight. The post-crosslinkable PU dispersions of the invention preferably contain a solids content of from 20 to 60% by weight and with-particular preference from 25 to 50% by weight. As a proportion of the overall composition, the fraction of solvents is preferably less than 15% by weight, with more preference less than 10% by weight and with most preference less than 5% by weight.

The PU dispersions of the invention can be employed in combination with suitable reaction partners containing isocyanate-reactive groups: for example, aqueous binders, such as polyurethane dispersions and/or polyacrylate dispersions and/or their mixtures or hybrids. Further suitable reaction partners include low molecular weight amines, which can be processed in solution in water to give heat-crosslinkable coating compositions which can be processed from the aqueous phase. Furthermore, the PU dispersions of the invention may also be incorporated into 1K binders such as, for example, polyurethane dispersions and/or polyacrylate dispersions and also polyurethane-polyacrylate hybrid dispersions.

The post-crosslinkable PU dispersions of the invention may also be used without the addition of a further reaction partner, for the purpose, for example, of coating or sizing or impregnating substrates containing hydrogen atoms which are reactive towards isocyanate groups.

The invention likewise provides for the use of the PU dispersions of the invention in paints and coating compositions. Post-crosslinkable polyurethane-polyurea dispersions may thus be added to formulations to produce sizes.

The post-crosslinkable PU dispersions of the invention are used either alone or in combination with other aqueous binders for the preparation of coating compositions. Such aqueous binders may be composed, for example, of polyester, polyacrylate, polybutadiene, polyvinyl acetate, polyepoxide or other polyurethane polymers. Also possible is the combination with radiation-curable binders, as described in, for example, EP-A-0 753 531.

The post-crosslinkable PU dispersions of the invention are used preferably as binders in coatings and adhesives. Coatings based on the compositions of the invention may be applied to any desired substrates, examples being metal, wood, glass, glass fibres, carbon fibers, stone, ceramic, minerals, concrete, hard and flexible plastics of a wide variety of kinds, woven and non-woven textiles, leather, paper, hard fibres, straw and bitumen, which may where appropriate have been provided with customary primers prior to coating. Preferred substrates are glass fibres, carbon fibres, metals, textiles and leather. One particularly preferred substrate is the glass fibre.

The post-crosslinkable PU dispersions of the invention can be used as such or in combination with the auxiliaries and additives known from coating technology, such as, for example, nonionic and/or anionic thickeners, fillers, pigments, waxes, hand agents, dyes, solvents, levelling agents and crosslinkers for the production of coatings.

The application of the coating materials can be effected by known methods, for example by brushing, pouring, knife coating, spraying, rolling or immersion. The coating film can be dried at room temperature or elevated temperature, but also by baking at up to 200° C.

The PU dispersions of the invention are storable and transportable and can be processed at any desired later point in time. Depending on the chosen chemical composition of the polyurethane, coatings having different properties are obtained. Thus, soft tacky coats and thermoplastic and elastomeric products having a wide range of hardnesses up to glass-hard thermosetting plastics can be obtained.

Preference is also given to the use of the post-crosslinkable PU dispersions of the invention in or as sizes, especially glass fibre sizes. Post-crosslinkable polyurethane-polyurea dispersions thus may be added to formulations to produce sizes.

The PU dispersions of the invention can be used in the sizes alone or preferably with other binders such as, for example, polyacrylate dispersions, polyurethane-polyacrylate hybrid dispersions, polyvinyl ether or polyvinyl ester dispersions, polystyrene or polyacrylonitrile dispersions, also in combination with crosslinkers such as blocked polyisocyanates (crosslinkers) and amino crosslinker resins such as, for example, melamine resins.

Furthermore, it is possible to add further crosslinkers prior to application. Crosslinkers suitable for this purpose are preferably hydrophilic or hydrophilicized polyisocyanate crosslinkers.

For the preparation of the sizes, the post-crosslinkable PU dispersions of the invention are generally used as binder component and crosslinker component and may comprise further components such as emulsifiers, further film-forming resins, adhesion promoters, lubricants and auxiliaries such as wetting agents or antistats. The adhesion promoters, lubricants and auxiliaries, the process for the preparation of the sizes and the process for sizing glass fibers and the subsequent processing of the glass fibers are known and are described, for example, in K. L. Loewenstein, "The Manufacturing Technology of Continous Glass Fibres", Elsevier Scientific Publishing Corp., Amsterdam, London, New York, 1983.

The present invention also provides glass fibres sized with a size comprising the PU dispersions of the invention.

Both the known glass types used for glass filament manufacture, such as E, A, C and S glass, and the other products known per se from glass fiber manufacturers are suitable for the sized glass fibres. Among said glass types for the production of continuous glass filaments, the E glass fibers, owing to their freedom from alkali, high tensile strength and high modulus of elasticity, are the most important for reinforcing plastics.

As matrix polymers it is possible to use a large number of thermoplastics and thermosetting polymers. Examples of suitable thermoplastic polymers include the following: polyolefins such as polyethylene or polypropylene, polyvinyl chloride, addition polymers such as styrene/acrylonitrile copolymers, ABS, polymethacrylate or polyoxymethylene, aromatic and/or aliphatic polyamides such as polyamide 6 or polyamide 6,6, polycondensates, such as polycarbonate, polyethylene terephthalate, liquid-crystalline polyaryl esters, polyarylene oxide, polysulfone, polyarylene sulfide, polyaryl sulfone, polyether sulfone, polyaryl ethers or polyether ketone or polyadducts such as polyurethanes. Examples that may be mentioned of suitable thermosetting polymers include the following: epoxy resins, unsaturated polyester resins, phenolic resins, amine resins, polyurethane resins, polyisocyanurates, epoxide/isocyanurate combination resins, furan resins, cyanurate resins and bismaleimide resins.

EXAMPLES

The mechanical properties of post-crosslinkable PU dispersions are determined on free films produced as follows:

A film applicator consisting of two polished rolls which can be set an exact distance apart has a release paper inserted into it ahead of the back roll. The distance between the paper and the front roll was adjusted using a feeler gange. This distance corresponds to the wet film thickness of the resulting coating, and can be adjusted to the desired add-on of each coat. Coating can also be carried out consecutively in two or more coats. To apply the individual coats, the products (aqueous formulations are adjusted to a viscosity of 4500 mPa s beforehand by adding ammonia/polyacrylic acid) were poured onto the nip between the paper and the front roll, the release paper was pulled away vertically downwards, and the corresponding film was formed on the paper. Where two or more coats were to be applied, each individual coat was dried and the paper was reinserted.

The 100% modulus was determined in accordance with DIN 53504 on films >100 $\mu$m thick.

The average particle sizes (the numerical average is stated) of the PU dispersions were determined by means of laser correlation spectroscopy (instrument: Malvern Zetasizer 1000, Malver Inst. Limited).

Film storage under hydrolysis conditions takes place in accordance with DIN EN 12280-3. The mechanical properties of these film samples are determined after 24 hours storage under standard conditions (20° C. and 65% humidity) in accordance with DIN 53504.

Example 1 (Inventive)

128.8 g of the polyether Desmophen® 3600 Z (Bayer AG, DE, difunctional polyether based on propylene oxide with an average molar weight of 2000 (OHZ=56)), 25.6 g Polyether® L 400 (Bayer AG, DE, difunctional polyether based on propylene oxide with an average molar weight of 561 (OHZ=200)) 86.4 g Polyether LB 25 (Bayer AG, DE, monofunctional polyether based on ethylene oxide/propylene oxide with an average molar weight of 2250 (OHZ=25)) and 21.5 g N-tert-butylbenzylamine are introduced into a vessel and heated to 70° C. Then 100.01 g Desmodur® W (Bayer AG, DE) are added over the course of 5 minutes. The subsequent stirring time at 75° C. is 45 minutes. Following the addition of 5.2 g trimethylolpropane the reaction mixture is stirred at 75° C. until the theoretical NCO value has been reached and is then cooled to 60° C. Dispersing is carried out by adding 527.0 g water (20° C.) over the course of 10 minutes. Immediately after dispersion, a solution of 1.70 g of hydrazine monohydrate, 10.2 g of isophoronediamine and 178.6 g of water at 40° C. is added over the course of 5 minutes. The subsequent stirring time at 40° C. is 3 hours. This gives a storage-stable aqueous PU dispersion containing blocked isocyanate groups which has a solids content of 33.0%.

Example 2 (Comparative)

128.8 g of the polyether Desmophen® 3600 Z (Bayer AG, DE, difunctional polyether based on propylene oxide with an average molar weight of 2000 (OHZ=56)), 25.6 g Polyether L 400 (Bayer AG, DE, difunctional polyether based on propylene oxide with an average molar weight of 561 (OHZ=200)), 86.4 g Polyether LB 25 (Bayer AG, DE, monofunctional polyether based on ethylene oxide/propylene oxide with an average molar weight of 2250 (OHZ=25)) and 14.9 g ε-Caprolactam are introduced into a vessel and heated to 70° C. Then 100.01 g Desmodur® W (Bayer AG, DE) are added over the course of 5 minutes and the reaction mixture is heated to 100° C. The subsequent stirring time at 100° C. is 45 minutes. Following the addition of 5.2 g trimethylolpropane the reaction mixture is stirred at 100° C. until the theoretical NCO value has been reached and is then cooled to 60° C. Dispersing is carried out by adding 527.0 g water (20° C.) over the course of 10 minutes. Immediately after dispersion, a solution of 1.70 g of hydrazine monohydrate, 10.2 g of isophoronediamine and 178.6 g of water at 40° C. is added over the course of 5 minutes. The subsequent stirring time at 40° C. is 3 hours. This gives a storage-stable aqueous PU dispersion containing blocked isocyanate groups which has a solids content of 34.6%.

TABLE 1

Results of the mechanical properties of free films produced from examples 1 and 2

| | Example 1 (inventive) | Example 2 (comparative) |
|---|---|---|
| Blocking agent | Tert-butylbenzylamine | Caprolactam |
| Average particle size | 169 nm | 180 nm |
| Drying conditions | 10 min, 125° C. | 10 min, 125° C. |
| Tensile test: 0 value | | |
| 100% modulus [MPa] | 2.2 | 1.1 |
| Tensile strength [MPa] | 2.9 | 1.1 |
| Elongation at break [%] | 190 | 130 |
| Tensile test after 7 d of hydrolysis | | |
| Tensile strength [MPa] | 4.0 | has run |
| Elongation at break [%] | 200 | has run |
| Tensile test after 2 weeks of hydrolysis | | |
| Tensile strength [MPa] | 4.0 | has run |
| Elongation at break [%] | 260 | has run |
| Tensile test after 4 weeks of hydrolysis | | |
| Tensile strength [MPa] | 4.3 | has run |
| Elongation at break [%] | 130 | has run |
| Tensile test after 6 weeks of hydrolysis | | |

TABLE 1-continued

Results of the mechanical properties of free films produced from examples 1 and 2

| | Example 1 (inventive) | Example 2 (comparative) |
|---|---|---|
| Tensile strength [MPa] | 4.3 | has run |
| Elongation at break [%] | 120 | has run |
| Tensile test after 8 weeks of hydrolysis | | |
| Tensile strength [MPa] | 3.9 | has run |
| Elongation at break [%] | 130 | has run |

The results shown in table 1 demonstrate that with the use of the inventive PU dispersion from example 1 a substantially higher hydrolysis resistance is achieved than with the prior art PU dispersion (example 2). Furthermore, it is evident from the tensile strength and elongation at break that, with the dispersion from example 1, significantly higher mechanical properties are obtained after a drying time of 10 minutes at 125° C. on account of the lower deblocking temperature of the blocking agent N-tert-butylbenzylamine, as compared with dispersion from example 2, which contains a prior art blocking agent (caprolactam).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Post-crosslinkable polyurethane-polyurea dispersions composed of:
    A1) polyisocyanates,
    A2) polymeric polyols having average molar weights of 400 to 6 000,
    A3) optionally mono- or polyalcohols or mono- or polyamines having average molar weights of up to 400,
    A4) at least one blocking agent, of which at least 20% by weight is composed of aralkylamines,
    and at least one compound selected from
    A5) compounds which have at least one ionic or potentially ionic group and
    A6) nonionically hydrophilicizing compounds.

2. Post-crosslinkable polyurethane-polyurea dispersions according to claim 1, wherein at least 5% of the isocyanate groups of component A1) are in blocked form.

3. Post-crosslinkable polyurethane-polyurea dispersions according to claim 1, wherein the dispersions have a solids content of between 10 to 70% by weight.

4. Post-crosslinkable polyurethane-polyurea dispersions according to claim 1, wherein the dispersions have a solvent fraction of less than 15% by weight as a proportion of the overall composition.

5. Post-crosslinkable polyurethane-polyurea dispersions according to claim 1, wherein aralkylamines are used as blocking agents.

6. Post-crosslinkable polyurethane-polyurea dispersions according to claim 1, wherein secondary benzylamines are used as blocking agents.

7. Post-crosslinkable polyurethane-polyurea dispersions according to claim 1, wherein N-tert-butylbenzylamine is used as blocking agent.

8. Method for producing one of paints and coating compositions, comprising adding post-crosslinkable polyurethane-polyurea dispersions according to claim 1 to a formulation.

9. Method for producing sizes, comprising adding post-crosslinkable polyurethane-polyurea dispersions according to claim 1 to a formulation.

10. Method for producing glass fiber sizes, comprising adding post-crosslinkable polyurethane-polyurea dispersions according to claim 1 to a formulation.

11. Coating compositions comprising post-crosslinkable polyurethane-polyurea dispersions according to claim 1.

12. Sizes comprising post-crosslinkable polyurethane-polyurea dispersions according to claim 1.

13. Glass fibre sizes comprising post-crosslinkable polyurethane-polyurea dispersions according to claim 1.

14. Substrates coated with a coating composition comprising post-crosslinkable polyurethane-polyurea dispersions according to claim 1.

15. Glass fibres sized with a size comprising post-crosslinkable polyurethane-polyurea dispersions according to claim 1.

* * * * *